(12) United States Patent
Bzowy

(10) Patent No.: US 7,399,648 B2
(45) Date of Patent: Jul. 15, 2008

(54) METHODS AND APPARATUS FOR DETERMINING LOCATION-BASED ON-CHIP VARIATION FACTOR

(75) Inventor: Denis Bzowy, Anzing (DE)

(73) Assignee: Agere Systems Inc., Allentown, PA (US)

( * ) Notice: Subject to any disclaimer, the term of this patent is extended or adjusted under 35 U.S.C. 154(b) by 573 days.

(21) Appl. No.: 11/124,307

(22) Filed: May 6, 2005

(65) Prior Publication Data

US 2006/0253820 A1 Nov. 9, 2006

(51) Int. Cl.
*H01L 29/06* (2006.01)
*H01L 31/072* (2006.01)
*H01L 31/109* (2006.01)
*H01L 31/0328* (2006.01)
*H01L 31/0336* (2006.01)

(52) U.S. Cl. ............................... 438/14; 438/17; 716/4
(58) Field of Classification Search .................. 438/14, 438/17, 18; 716/4, 6, 10
See application file for complete search history.

(56) References Cited

U.S. PATENT DOCUMENTS 6,880,133 B2* 4/2005 Meyer et al. .................... 716/1

2005/0246117 A1* 11/2005 Hathaway et al. ............. 702/69

OTHER PUBLICATIONS

D.G. Chinnery et al., "Closing the Gap Between ASIC and Custom: An ASIC Perspective," IEEE, Kluwer, pp. 637-642, 2002.
M. Weber, "My Head Hurts, My Timing Stinks, and I Don't Love On-Chip Variation," SNUG Boston, pp. 1-21, 2002.
M. Orshansky et al., "Impact of Spatial Intrachip Gate Length Variability on the Performance of High-Speed Digital Circuits," IEEE Transactions on Computer-Aided Design of Integrated Circuits and Systems, vol. 21, No. 5, pp. 544-553, May 2002.

* cited by examiner

*Primary Examiner*—Phuc T Dang
(74) *Attorney, Agent, or Firm*—Ryan, Mason & Lewis, LLP

(57) ABSTRACT

Techniques for determining a location-based on-chip variation factor for an integrated circuit device are provided. A first on-chip variation factor is computed for at least one of two or more signal paths of the integrated circuit device. The first on-chip variation factor is a function of a timing delay. A second on-chip variation factor is also computed for the integrated circuit device. The second on-chip variation factor is a function of a physical layout of the integrated circuit device. The first on-chip variation factor and the second on-chip variation factor are combined for the at least one of the two or more signal paths to determine a location-based on-chip variation factor for the at least one of the two or more signal paths.

20 Claims, 3 Drawing Sheets

METHODS AND APPARATUS FOR DETERMINING LOCATION-BASED ON-CHIP VARIATION FACTOR

FIELD OF THE INVENTION

The present invention relates generally to integrated circuits and, more particularly, to techniques for determining a location-based on-chip variation factor for a given integrated circuit signal path.

BACKGROUND OF THE INVENTION

Signal speeds associated with integrated circuit devices may be subject to both inter-chip variation and on-chip variation. Inter-chip variation, or differing speeds among integrated circuit devices in a system, has been a noted concern in the integrated circuit industry. As a result, various techniques have been developed for determining and compensating for inter-chip variation. However, on-chip variation (OCV), or differing signal path speeds in an individual integrated circuit device, is a relatively new concern for application-specific integrated circuit (ASIC) vendors and fabricators.

In order to determine OCV of signal paths of an integrated circuit device, simulated timing delays of the signal paths may be modeled with the use of a timing analysis tool. OCV typically results from both cell and wire delays of the integrated circuit device, however, an integrated circuit device may produce wire delays that are less than 1% of the critical path delay. This percentage of the critical path delay may be determined by a simple script running over timing path reports. Thus, OCV determination techniques may ignore the portion of OCV that is attributable to wire delay.

In modeling signal path delays, ASIC vendors and fabricators typically provide "worst-case fast" and "worst-case slow" simulated timing delay models. For example, cells in a signal path will never be faster than the worst-case fast model, or slower than the worst-case slow model. The determined OCV factor may be added to a signal path of the integrated circuit device in various ways, which are known to those skilled in the art.

As the size and complexity of an integrated circuit device increases, the resulting magnitude of OCV also increases. For example, a 20×20 millimeter chip with 5000 cell rows has an increased chance of having cells in the integrated circuit device operating at different speeds. A larger chip also has an increased chance of its signal paths being affected by process, voltage, temperature (PVT) factors, which may vary across the surface of an integrated circuit device.

Process variation may be caused by the optical proximity effect, which occurs during optical lithography and results in systematic line width variations across the chip. Process variation may also be caused by aberrations in the optical system of the wafer stepper. Process variation also has two main effects: variation in the effective gate length, and variations in wire resistivity and geometry. These effects thereby result in changes in the speed of a signal path. Regarding voltage variation across a chip surface, static voltage drop (IR drop) is commonly modeled in the industry, for example, using a software program known as Astro-Rail™, commercially available from Synopsys, Inc., California, USA. However, voltage and process variation are complex, and remain a domain for specialists in the integrated circuit industry. See, for example, D. Chinnery et al., "Closing the Gap between ASIC and Custom," Kluwer, 2002. Furthermore, real data about the size of PVT factors is often proprietary, hard to come by, or both.

Commonly, in order to determine an OCV factor for each signal path, the timing analysis tool is run at a single worst case PVT point. However, due to the fact that PVT factors vary across the integrated circuit device, using an OCV factor computed from a single PVT point is unduly pessimistic, and can significantly increase project time, and thus development costs. Much of the delay resulting in OCV depends on the distances between the cells involved; for example, there is less of a delay if the cells are close together, more if they are far apart. Assuming a worst case variation of PVT factors for purposes of fabrication, as described above, may lead to signal path delays large enough to seriously disrupt an ASIC project schedule.

Thus, a need exists for improved techniques for determining an OCV factor that takes into account the effects of varying PVT factors across the surface of the integrated circuit device.

SUMMARY OF THE INVENTION

The present invention provides a location-based on-chip variation factor determination technique for integrated circuits having multiple signal paths. As chips get larger, OCV becomes more significant. A location-based on-chip variation factor provides a more accurate OCV analysis by combining timing path delays with physical cell locations on the integrated circuit device, to help designers improve OCV factor determination.

In accordance with one aspect of the invention, a method for determining a location-based on-chip variation factor for an integrated circuit device is provided. A first on-chip variation factor is computed for at least one of two or more signal paths of the integrated circuit device. The first on-chip variation factor is a function of a timing delay. A second on-chip variation factor is also computed for the integrated circuit device. The second on-chip variation factor is a function of a physical layout of the integrated circuit device. The first on-chip variation factor and the second on-chip variation factor are combined for the at least one of the two or more signal paths to determine a location-based on-chip variation factor for the at least one of the two or more signal paths.

Additionally, in accordance with the embodiments of the present invention, the first on-chip variation factor is computed by determining a timing path delay for at least one of the two or more signal paths using a timing analysis tool. The second on-chip variation factor is computed by determining a physical layout of the two or more signal paths in the integrated circuit device. A box is defined that bounds the two or more signal paths in the physical layout. A length of a diagonal of the box is determined and used to compute the second on-chip variation factor by multiplying a defined PVT variation across the surface of the integrated circuit device by the length of the diagonal.

These and other objects, features, and advantages of the present invention will become apparent from the following detailed description of the illustrative embodiments thereof, which is to be read in connection with the accompanying drawings.

DETAILED DESCRIPTION

OCV in timing analysis is used to model physical variation in integrated circuits through the use of a factor that penalizes the delay of a path when compared to another path. As will be described in detail below, the embodiments of the present invention incorporate the relative physical location of the elements included in the analysis into the determination of the OCV factor. In this manner, the OCV penalty may be lower for paths within a smaller area on the integrated circuit device.

Figure 1:
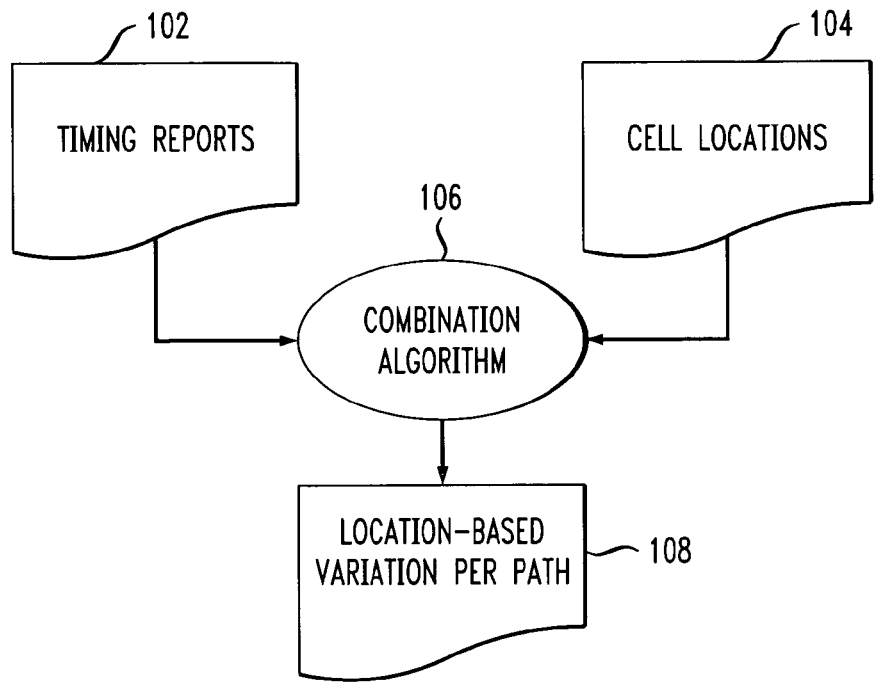
FIG. 1 is a block diagram illustrating location-based on-chip variation factor determination, according to an embodiment of the present invention.

Referring initially to FIG. 1, a block diagram illustrates location-based on-chip variation (LOCV) factor determination, according to an embodiment of the present invention. The methodology begins in block 102, where timing reports are obtained, preferably from a timing analysis tool, such as, for example, PrimeTime®, commercially available from Synopsis, Inc. The obtaining of timing reports will be described in more detail below with regard to FIG. 2. In block 104, physical cell locations in the integrated circuit device are determined, preferably from a cell layout tool, such as, for example, Astro™, also commercially available from Synopsis, Inc. The use of physical cell locations in determining LOCV factor will be described in more detail below with regard to FIG. 3. Information from the timing reports is combined with information from the physical layout of cell locations in block 106 to produce an LOCV factor for a given path of the integrated circuit device in block 108.

Figure 2:
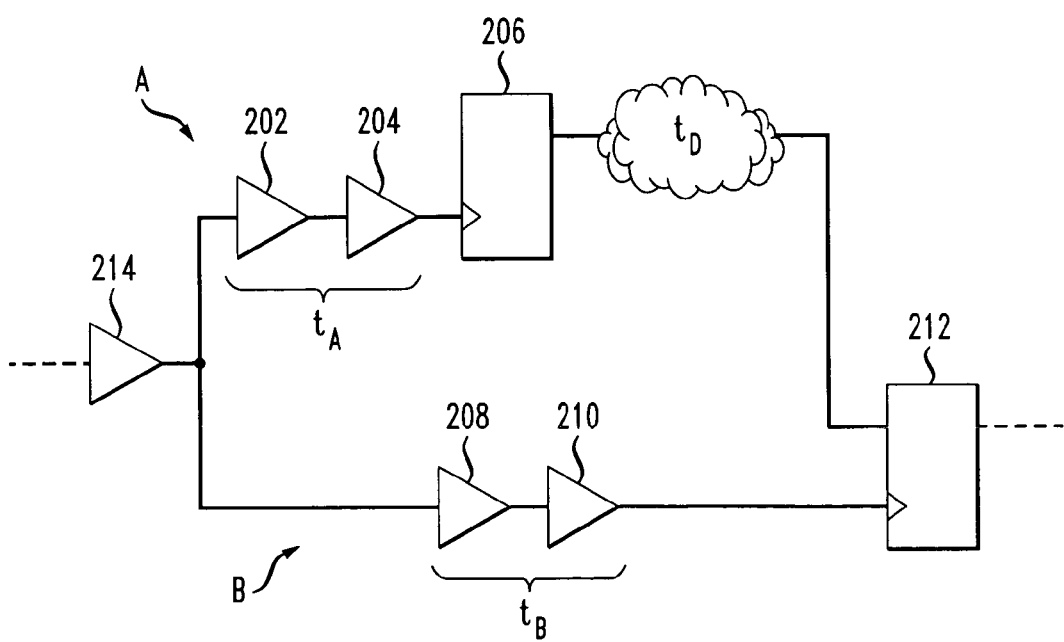
FIG. 2 is a circuit diagram illustrating an integrated circuit device having two signal paths for use in obtaining a timing report, according to an embodiment of the present invention.

A circuit diagram is shown in FIG. 2, which illustrates two clock branches of an integrated circuit device, according to an embodiment of the present invention. This may be considered a detailed description of the obtaining of timing reports in block 102 for use in determining the LOCV factor, as shown in FIG. 1. A first clock branch A is shown having two clock driver cells 202, 204 before a first flip-flop 206. A second clock branch B is also shown having two clock driver cells 208, 210 before a second flip-flop 212. Only those clock driver cells after a last common driver cell 214 are considered part of either disjoint clock branch A or B.

In this embodiment of the present invention, $t_A$ represents the time it should take for a signal to pass through clock driver cells 202 and 204 of first clock branch A, based on the properties of clock driver cells 202, 204. Additionally, $t_B$ represents the time it should take for a signal to pass through clock driver cells 208, 210 of second clock branch B, based on the properties of clock driver cells 208, 210. If first flip-flop 206 and second flip-flop 212 have the same clock drivers, then $t_A = t_B = 0$, and the clock variation is 0.

The time through first flip-flop 206 and combinational logic to second flip-flop 212 is represented as $t_D$ in FIG. 2. In this embodiment of the present invention, $t_D$ also includes the clock-to-output delay of first flip-flop 206, and a setup or hold time. A setup time and a hold time are required margins at second flip-flop 212. A setup time, tsetup, is the time required for an input data signal to remain at a constant level at the data input of second flip-flop 212 prior to arrival of the active edge of the clock signal at the clock input of second flip-flop 212. A hold time, thold, is the time required for an input data signal to remain at a constant level at the data input of second flip-flop 212 after the arrival of the active edge of the clock signal at the clock input of second flip-flop 212. The illustrative embodiments will be described below with reference to the hold constraint, although the described techniques can be adapted in a straightforward manner to other timing constraints, such as a setup time constraint.

The hold constraint for proper functioning of the path from first flip-flop 206 to second flip-flop 212 may be defined as follows:

Hold constraint:

$$t_A + t_D >= t_B + \text{thold; and}$$

The embodiments of the present invention consider the hold constraint under worst-case fast conditions, and incorporate thold within $t_D$. Thus, the hold constraint is more simply defined as:

$$t_A + t_D >= t_B.$$

In order for the chip not to fail, the hold constraint must be satisfied. For example, if $t_A$ and $t_B$ are both 500 picoseconds (ps), and $t_D$ is 45 ps, the hold constraint is met, resulting in a 45 ps margin as shown below:

$$500 + 45 >= 500.$$

As described above, in previous attempts to determine OCV a simulated timing delay for a signal path is modeled with the use of a timing analysis tool incorporating a single PVT point with worst case PVT factors. When OCV is taken into account in the example provided above, one signal path may be determined to be slower than the other signal path. For example, $t_B$ may be determined to be 10% slower than $t_A$. Inputting the OCV factor into the hold constraint with the values provided in the example above results in the following:

$$500 + 45 < 1.10 * 500$$

This incorporation of the OCV factor into the hold constraint results in a −5 ps margin. Thus, the hold constraint is not satisfied, and termed as a "hold variation." ASIC fabricators would determine that the chip would fail under these worst-case fast conditions, and that this failure may take place in either a scan test or in a functional mode in the field.

FIG. 2 illustrates the obtaining of an OCV factor from timing reports. However, instead of incorporating worst case PVT variation, the embodiments of the present invention determine an OCV factor from simulated timing reports that only incorporate noisy distance-independent variation. This may result in an OCV factor that is smaller than 10% as described above. The effect of distance-dependent PVT variation on signal path speed is determined in a separate step, as described below with regard to FIG. 3. Thus, according to embodiments of the present invention, the OCV factors determined for a given path from these timing reports, without the effect of distance-dependent PVT variation, are fed to block 106 of FIG. 1 to determine an LOCV factor.

Figure 3:
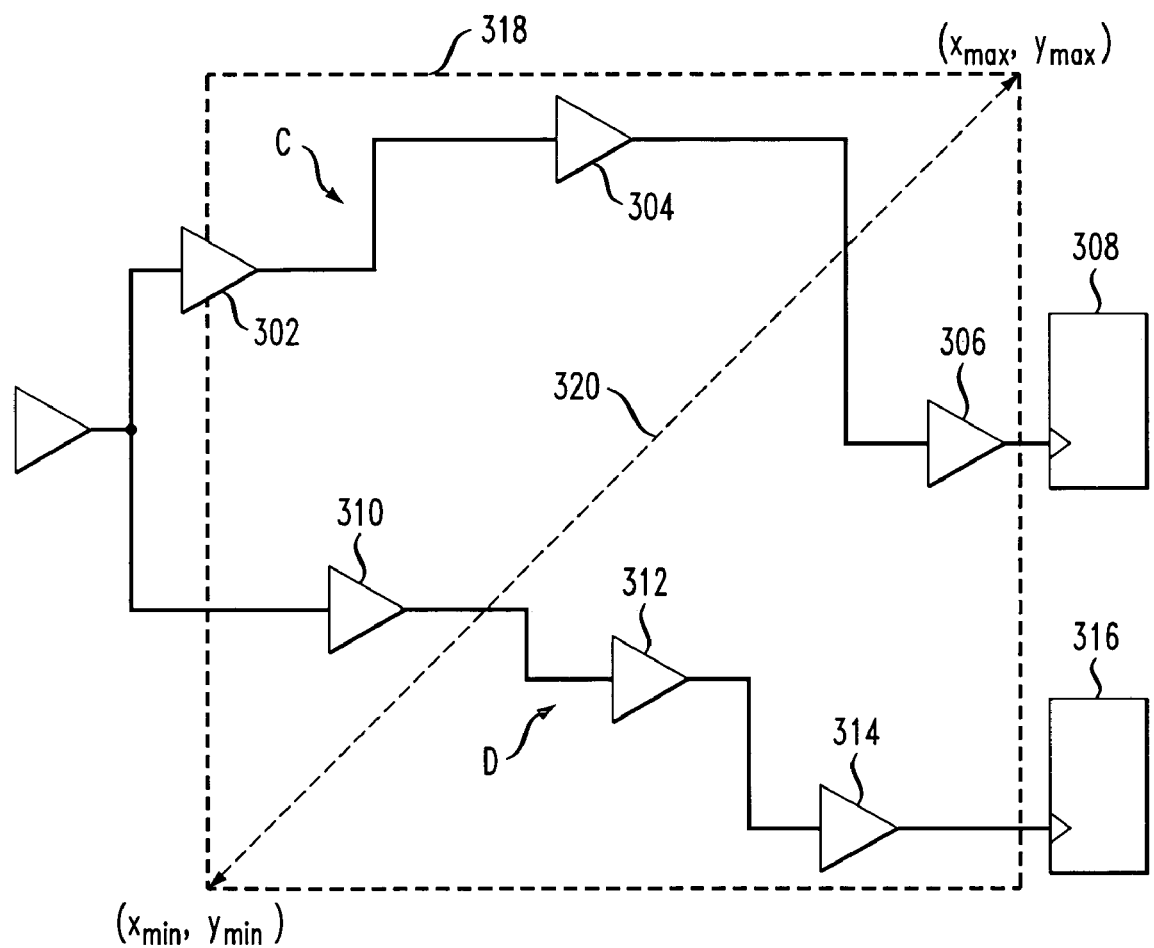
FIG. 3 is a circuit diagram illustrating a bounding box around a physical layout of two signal paths of an integrated circuit device, according to an embodiment of the present invention.

Referring now to FIG. 3, a circuit diagram illustrates a physical layout of signal paths for use in determining an LOCV factor, according to an embodiment of the present invention. This may be considered a detailed description of the use of cell locations obtained in block 104 in the determination of an LOCV factor in block 106 of FIG. 1.

A first signal path C is shown with three clock driving cells 302, 304, 306 before a first flip-flop 308. A second signal path D is also shown with three clock driving cells 310, 312, 314 before a second flip-flop 316. The locations of these cells are determined with the use of a cell layout program, such as, for example, the above-noted Astro™ program. A bounding box 318 is established around the physical layout of the clock driver cells of first and second signal paths C and D. Bounding box 318 is only as large as necessary to enclose all of the clock driver cells of the signal paths. A diagonal, or spread, 320 is drawn across bounding box 318 to determine a measurement, preferably in millimeters, from an $(x_{min}, y_{min})$ coordinate to an $(x_{max}, y_{max})$ coordinate of bounding box 318.

According to embodiments of the present invention, LOCV factor determination techniques are modeled as a sum of two terms: an OCV term for each path based on simulated timing reports, as described above with regard to FIG. 1, and a term based on the area of the chip that the paths cover. For example, a 2% term may be provided for a given path based on the simulated timing report, and a 0.5% per-mm term may be provided based on the variation of PVT factors across the surface of the chip. The per-mm term models smooth PVT variation, which is less when cells of the paths remain close in the physical layout of the integrated circuit device, and more when cells of the paths are spread far apart in the physical layout of the integrated circuit device.

Thus, an equation for providing LOCV factor for a given signal path may be provided:

$$Var_{loc}(cells) = Var_{mm} * spread(cells) + Var_0;$$

where: $Var_{loc}(cells)$ is the LOCV factor; $Var_{mm}$ is the variation per millimeter; spread(cells) is the measurement of the length of the diagonal of the bounding box in millimeters; and $Var_0$ is the variation provided for the path from the simulated timing reports.

For example, when $Var_{mm}$ is 0.5% per mm and $Var_0$ is 2% for a given path, an LOCV factor is equal to 2% for that given path when the measured signal paths have adjacent clock driver cells. This is due to the fact that the diagonal measurement, spread(cells), of a bounding box enclosing the signal paths would be negligible. However, an LOCV factor of 12% results when the measured signal paths are spread to opposite corners of chip having 14 mm sides and a 20 mm diagonal. With two parameters, $Var_{mm}$ and $Var_0$, an OCV factor can be modeled more accurately than with a single parameter that takes into account worst case PVT variation.

Using the newly defined LOCV factor, the hold constraint is then defined by:

$$t_A + t_D > = Var_{loc} * t_B$$

Therefore, using the example provided above with regard to FIG. 1, where $t_A$ and $t_B$ are both 500 ps, and $t_D$ is 45 ps, and clock driver cells are adjacent, resulting in a $Var_{loc}$ of 2%, the integrated circuit device would satisfy the hold constraint, resulting in a margin of 35 ps.

Further, in an example having spread cells, resulting in a $Var_{loc}$ of 12%, the hold constraint fails by a greater amount than previously described in FIG. 1, specifically, −15 ps. This provides ASIC fabricators with a more accurate margin so that the timing of the signal paths may be properly adjusted to ensure that the chip will not fail while in use in the field.

Figure 4:
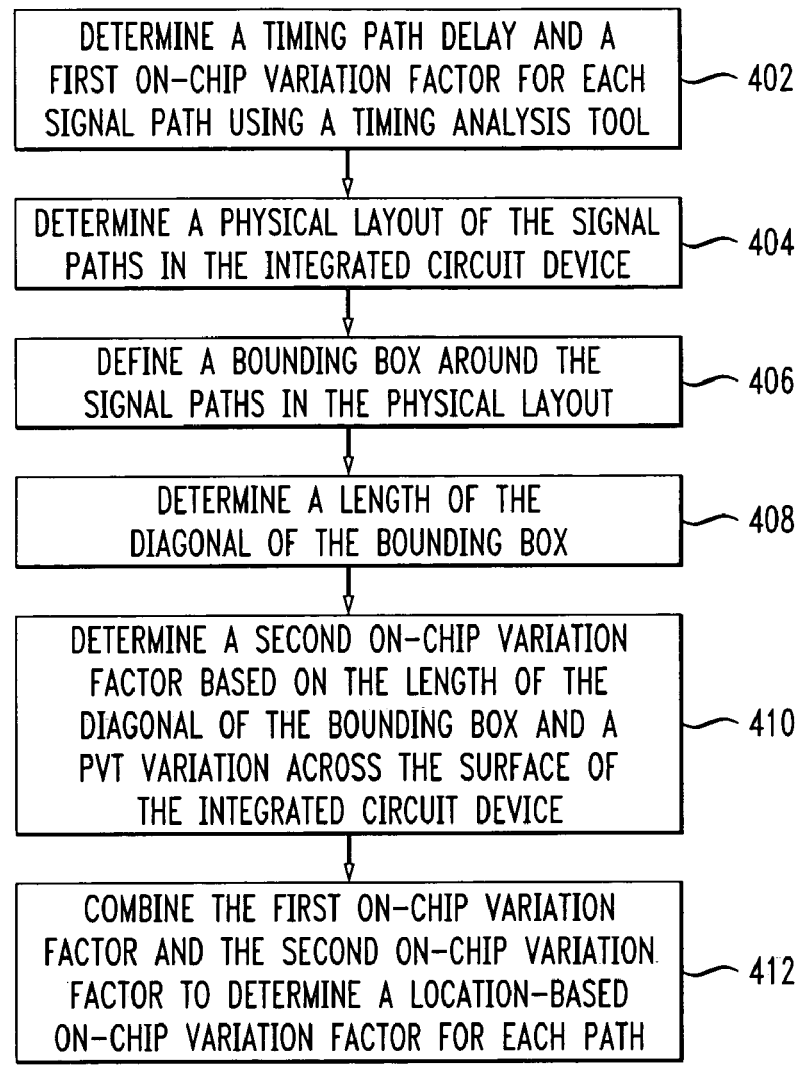
FIG. 4 is a flow diagram illustrating a location-based on-chip variation factor determination methodology, according to an embodiment of the present invention.

FIG. 4 shows a flow diagram illustrating an LOCV factor determination methodology, according to an embodiment of the present invention. The methodology begins in block 402 where a timing path delay for each of two or more signal paths is determined using a timing analysis tool. The timing path delay is computed only taking distance-independent variation into account. This provides a first OCV factor for a given signal path of the integrated circuit device, shown in block 102 of FIG. 1, as well as the description of the circuit diagram of FIG. 2.

In block 404, a physical layout of the signal paths in the integrated circuit device is determined, as shown above in block 104 of FIG. 1. A box is then defined that bounds the signal paths in the physical layout in block 406. The bounding box is only as large as necessary to accommodate all of the cells of the signal paths within it. A length, preferably in millimeters, of the diagonal of the box is then determined in block 408. Both blocks 406 and 408 are described in detail above with regard to FIG. 3. A second OCV factor is computed for the signal paths enclosed in the box of the integrated circuit device using the diagonal of the box and a defined PVT variation across the surface of the integrated circuit device in block 410. Finally, in block 412, the first OCV factor and the second OCV factor are combined for a given path to determine an LOCV factor for the path, thereby terminating the methodology.

Figure 5:
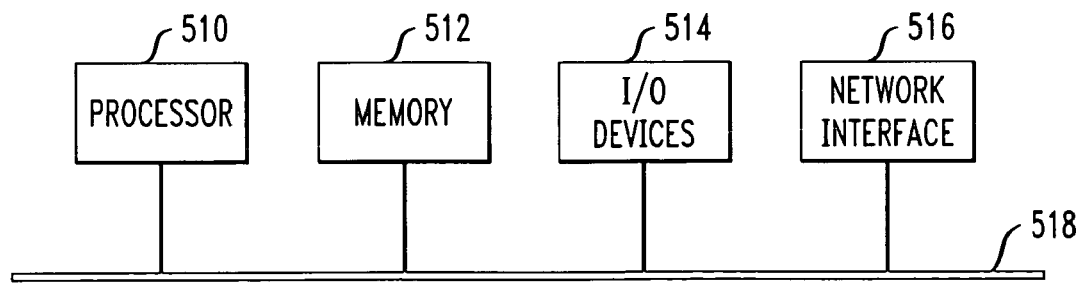
FIG. 5 is a block diagram of an illustrative hardware implementation of a computing system in accordance with which one or more components/methodologies of the invention may be implemented.

Referring now to FIG. 5, a block diagram illustrates an illustrative hardware implementation of a computing system in accordance with which one or more components/methodologies of the invention (e.g., components/methodologies described in the context of FIGS. 1-4) may be implemented. As shown, the computer system may be implemented in accordance with a processor 510, a memory 512, I/O devices 514, and a network interface 516, coupled via a computer bus 518 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices. The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices for entering, for example, information associated with signal path timing reports and integrated circuit device physical layout, into the processing unit, and/or one or more output devices for outputting, for example, an LOCV factor, associated with the processing unit.

Still further, the phrase "network interface" as used herein is intended to include, for example, one or more transceivers to permit the computer system to communicate with another computer system via an appropriate communications protocol. This may provide access to a computer systems that provide information regarding timing reports of signal paths or physical layouts of integrated circuit devices.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

LOCV factor combines path delays, from a timing analysis tool, with cell locations, to calculate LOCV factor for a given path. Without knowing the layout, normal OCV factor can use only a constant variation factor for all paths. LOCV factor takes into account physical cell locations on the integrated circuit device and the effects of varying PVT factors across the surface of the integrated circuit device.

Additional embodiments of the present invention may incorporate various numbers and configurations of cells, flip-flops or other circuit elements, and signal paths in the integrated circuit device. While two signal paths are described above, additional embodiments of the present invention may incorporate more than two signal paths. For example, where three signal paths are used, a determined LOCV factor may be applied to two of the signal paths, where each of the two paths may have a different first term representing the timing report OCV.

Further, additional embodiments of the present invention may utilize a measurement other than the diagonal of the bounding box as a basis for the second term of the LOCV equation, for example, an area of the bounding box may be used. However, this change must also be taken into account in the determination of the PVT factor applied to the measurement, since a measurement based on area will not increase or decrease in the same fashion as a measurement based on distance. In addition, bounding boxes having shapes other than those shown in the illustrative embodiments may be used in alternative embodiments. The term "box" as used herein is therefore intended to be construed broadly, so as to encompass a variety of shapes. Finally, while measurements in millimeters are described as preferred in the embodiments of the present invention, other units may be utilized but must also correspond to the determination of the PVT factor applied to the measurement in the LOCV equation.

The present invention may be utilized in conjunction with the manufacture of integrated circuits. Regarding integrated circuits in general, a plurality of identical die are typically formed in a repeated pattern on a surface of a semiconductor wafer. Each die may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

Therefore, although illustrative embodiments of the present invention have been described herein with reference to the accompanying drawings, it is to be understood that the invention is not limited to those precise embodiments, and that various other changes and modification may be made by one skilled in the art without departing from the scope or spirit of the invention.

What is claimed is:

1. A method for determining a location-based on-chip variation factor for an integrated circuit device comprising the steps of:
    computing a first on-chip variation factor for at least one of two or more signal paths of the integrated circuit device, the first on-chip variation factor being a function of a timing delay;
    computing a second on-chip variation factor for the integrated circuit device, the second on-chip variation factor being a function of a physical layout of the integrated circuit device; and
    combining the first on-chip variation factor and the second on-chip variation factor for at least one of the two or more signal paths to determine a location-based on-chip variation factor for the at least one of the two or more signal paths.

2. The method of claim 1, wherein the step of computing a first on-chip variation factor comprises the step of determining a timing path delay for at least one of the two or more signal paths.

3. The method of claim 2, wherein, in the step of determining a timing path delay, a timing path delay is determined using a timing analysis tool.

4. The method of claim 3, wherein the step of determining a timing path delay comprises producing a timing analysis tool hold timing report.

5. The method of claim 1, wherein the step of computing a second on-chip variation factor comprises the steps of:
    determining a physical layout of the two or more signal paths in the integrated circuit device;
    defining a shape that bounds the two or more signal paths in the physical layout;
    determining a dimension of the shape; and
    computing the second on-chip variation factor based at least on the dimension of the shape.

6. The method of claim 5, wherein, in the step of determining a physical layout, a physical layout of the two or more signal paths in the integrated circuit device is determined using a cell layout tool.

7. The method of claim 5, wherein, in the step of defining a shape, the shape is only as large as necessary to enclose every cell of the two or more signal paths of the integrated circuit device.

8. The method of claim 7, wherein, in the step of defining a shape, only those cells after a last common cell are considered part of the two or more signal paths of the integrated circuit device.

9. The method of claim 5, wherein the shape comprises a box and the step of computing the second on-chip variation factor comprises the step of multiplying a defined variation by a length of a diagonal of the box.

10. The method of claim 9, wherein, in the step of multiplying a defined variation by the length of the diagonal, the defined variation comprises a defined process, voltage, temperature (PVT) variation across a surface of the integrated circuit device.

11. The method of claim 1, wherein, in the step of computing a first on-chip variation factor, the first on-chip variation factor is provided for distance-independent variation.

12. The method of claim 1, wherein, in the step of computing a second on-chip variation factor, the second on-chip variation factor models a distance-dependent PVT variation.

13. The method of claim 1, further comprising the step of determining if the location-based on-chip variation factor satisfies a hold constraint of the integrated circuit device.

14. The method of claim 13, wherein the step of determining if the location-based on-chip variation factor satisfies a hold constraint comprises the step of attributing the location-based on-chip variation factor to the at least one of the two or more signal paths.

15. Apparatus for determining a location-based on-chip variation factor for an integrated circuit device, comprising:
    a memory; and
    at least one processor coupled to the memory and operative to: (i) compute a first on-chip variation factor for at least one of two or more signal paths of the integrated circuit device, the first on-chip variation factor being a function of a timing delay; (ii) compute a second on-chip variation factor for the integrated circuit device, the second on-chip variation factor being a function of a physical layout of the integrated circuit device; and (iii) combine the first on-chip variation factor and the second on-chip variation factor for at least one of the two or more signal paths to determine a location-based on-chip variation factor for the at least one of the two or more signal paths.

16. The apparatus of claim 15, wherein the operation of computing a first on-chip variation factor comprises the operation of determining a timing path delay for at least one of the two or more signal paths.

17. The apparatus of claim 15, wherein the operation of computing a second on-chip variation factor comprises the operations of:
- determining a physical layout of the two or more signal paths in the integrated circuit device;
- defining a shape that bounds the two or more signal paths in the physical layout;
- determining a dimension of the shape; and
- computing the second on-chip variation factor based at least on the dimension of the shape.

18. The apparatus of claim 17, wherein the shape comprises a box and the operation of computing the second on-chip variation factor comprises the operation of multiplying a defined variation by a length of a diagonal of the box.

19. The apparatus of claim 18, wherein, in the operation of multiplying a defined variation by the length of the diagonal, the defined variation comprises a defined process, voltage, temperature (PVT) variation across a surface of the integrated circuit device.

20. An article of manufacture for determining a location-based on-chip variation factor for an integrated circuit device, comprising a machine readable medium containing one or more programs which when executed implement the steps of:
- computing a first on-chip variation factor for at least one of two or more signal paths of the integrated circuit device, the first on-chip variation factor being a function of a timing delay;
- computing a second on-chip variation factor for the integrated circuit device, the second on-chip variation factor being a function of a physical layout of the integrated circuit device; and combining the first on-chip variation factor and the second on-chip variation factor for at least one of the two or more signal paths to determine a location-based on-chip variation factor for the at least one of the two or more signal paths.

* * * * *